C. Collins. Combined Drag and Circular Saws.
No. 117259     Patented Jul 25 1871
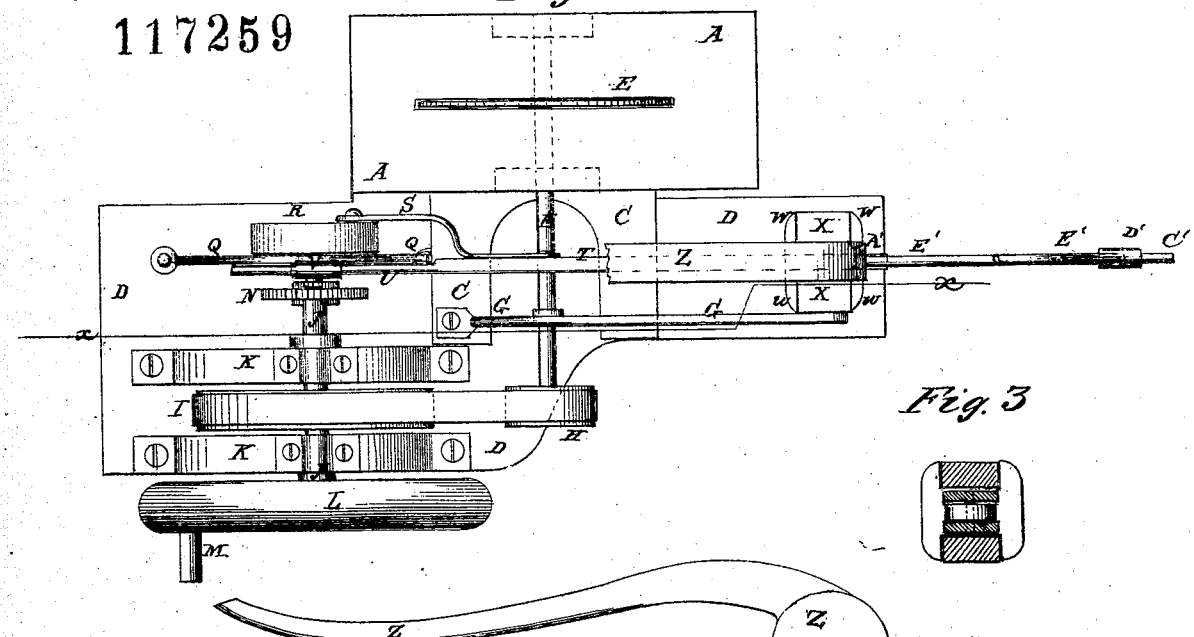
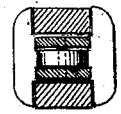
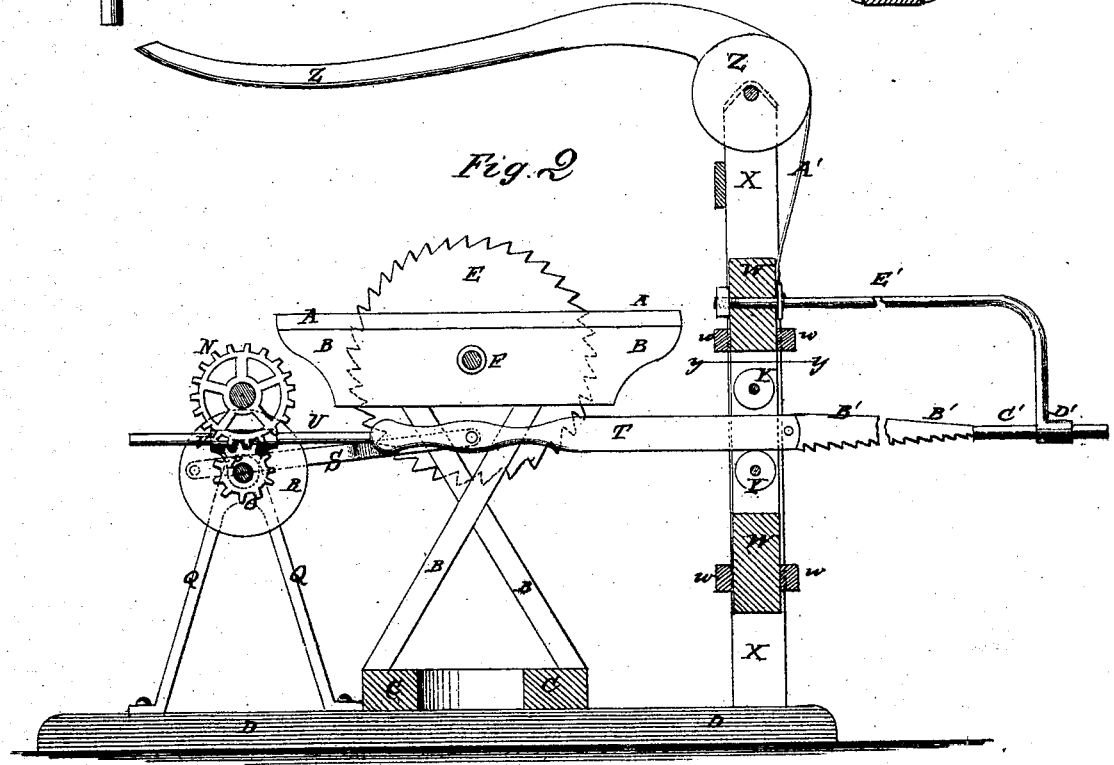
Witnesses:
A. W. Almqvist
Wm. H. C. Smith
Inventor:
C. Collins
per
[signature]
Attorneys.

117,259

UNITED STATES PATENT OFFICE.

CORNELIOUS COLLINS, OF JONESBOROUGH, INDIANA.

IMPROVEMENT IN SAWING-MACHINES.

Specification forming part of Letters Patent No. 117,259, dated July 25, 1871.

*To all whom it may concern:*

Be it known that I, CORNELIOUS COLLINS, of Jonesborough, in the county of Grant and State of Indiana, have invented a new and useful Improvement in Combined Drag and Circular Saws; and I do hereby declare that the following is a full, clear, and exact description thereof, which will enable others skilled in the art to make and use the same, reference being had to the accompanying drawing forming part of this specification.

Figure 1 is a top view of my improved machine. Fig. 2 is a detail sectional view of the same taken through the line $x\ x$, Fig. 1. Fig. 3 is a detail sectional view of the guide taken through the line $y\ y$, Fig. 2.

My invention has for its object to combine in one machine a drag and a circular saw in such a way that they may be operated together or separately, as may be desired, and in such a way that the machine may be simple in construction, convenient in use, and efficient in operation; and it consists in the construction and combination of the various parts of the machine, as hereinafter more fully described.

A is the circular-saw table, the frame B of which is attached to the bed or base-frame C, which is attached to or forms a part of the base or foundation-frame D of the machine. E is the circular saw, which projects through a slot in the table A in the ordinary manner, and which is attached to a mandrel or shaft, F, which revolves in bearing in the frame B. The inner end of the mandrel or shaft F projects, passes through a bearing in a supporting-bar G, and has a pulley, H, attached to it. The inner end of the supporting-bar G is bent downward, and is attached to the base-frame of the machine, and its outer end is attached to the guide-post for the drag-saw. The pulley H is connected with the large pulley I by a band. The pulley I is attached to a shaft, J, which revolves in bearings in the brackets or frames K attached to the base-frame of the machine. To the outer end of the shaft J is attached a wheel, L, which is made heavy to adapt it to serve as a fly-wheel, and which may have a crank-pin, M, attached to it to adapt the machine to be operated by hand-power, or may receive a band to adapt the machine to be operated by steam-power, horse-power, or other convenient power. To the inner end of the shaft J is attached a large gear-wheel, N, the teeth of which mesh into the teeth of the smaller gear-wheel O attached to the shaft P. The shaft P revolves in bearings in the inner frame K and in the supporting-bracket Q, which is attached to the base-frame of the machine. To the projecting end of the shaft P is attached a crank-wheel, R, which is made heavy to adapt it to serve as a fly-wheel, and to the crank-pin of which is pivoted the rear end of the connecting-rod S, the forward end of which is bent inward and is pivoted to the bar T. To the rear end of the bar T is attached, or upon it is formed, a rod, U, which passes through a guide, V, attached to the bracket Q, or which rides upon the shaft P. The bar T passes through the sliding frame W which moves up and down in the vertical slot in the guide-post X, the lower end of which is attached to the base-frame of the machine. The sliding frame W is kept in place in the guide-post X by the flanges W' formed upon or attached to the said sliding frame W, and which overlap the sides of the said guide-post X. In the upper and lower part of the frame W are pivoted the friction-wheels or rollers Y, one above and the other below the bar T. The frame W rests upon the bar T, and by its weight holds the said bar and the saw attached to it down to its work. The sliding frame W is raised to raise the saw to make another cut, or for any other desired purpose, by means of the lever Z which is pivoted in the upper end of the slot in the guide-post X, and the end of which extends back into such a position that it may be conveniently operated by the sawyer. The pivoted end of the lever Z is rounded off, and is connected with the sliding frame W by the leather strap A', a chain, or other flexible connection. B' is the drag-saw, the inner end of which is attached to the outer end of the bar T. To the outer end of the saw B' is attached, or upon it is formed, a rod, C', which passes through a guide-socket, D', attached to or formed in the outer and lower end of the bar E'. The bar E' extends upward and rearward, and its rear end passes through the upper part of the sliding frame W, to which it is secured by a collar and nut, as shown in Fig. 2, so that it may be raised and lowered with said saw.

Having thus described my invention, I claim as new and desire to secure by Letters Patent—

The machine herein shown and described, all the parts being constructed, combined, and arranged as and for the purpose specified.

The above specification of my invention signed by me this 13th day of April, 1871.

CORNELIOUS COLLINS.

Witnesses:
 EPHRAIM BARRETT,
 J. H. FORD.